(12) United States Patent
Shibata et al.

(10) Patent No.: US 8,302,479 B2
(45) Date of Patent: Nov. 6, 2012

(54) METHOD OF EVALUATION USING ULTRASONIC WAVES

(75) Inventors: Kaoru Shibata, Utsunomiya (JP);
Noriaki Shigematsu, Utsunomiya (JP);
Mitsutaka Igaue, Utsunomiya (JP);
Yushi Aoki, Utsunomiya (JP); Noriko Kurimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 541 days.

(21) Appl. No.: 12/512,388

(22) Filed: Jul. 30, 2009

(65) Prior Publication Data

US 2010/0024558 A1    Feb. 4, 2010

(30) Foreign Application Priority Data

Aug. 4, 2008 (JP) ................... 2008-200370
Sep. 3, 2008 (JP) ................... 2008-225884

(51) Int. Cl.
*G01N 29/04* (2006.01)
(52) U.S. Cl. .................. 73/628; 73/597; 73/602
(58) Field of Classification Search ............ 73/628, 73/597, 622, 624, 643, 602; 702/39, 56
See application file for complete search history.

(56) References Cited

U.S. PATENT DOCUMENTS

| | | | | |
|---|---|---|---|---|
| 5,194,709 A * | 3/1993 | Ichikawa et al. | ............ | 219/109 |
| 5,537,876 A * | 7/1996 | Davidson et al. | ............ | 73/624 |
| 5,920,014 A * | 7/1999 | Waschkies | ............ | 73/597 |
| 6,250,163 B1 * | 6/2001 | MacLauchlan et al. | ......... | 73/643 |
| 7,004,370 B2 * | 2/2006 | Arndt et al. | ............ | 228/8 |
| 7,373,822 B2 * | 5/2008 | Waschkies et al. | ............ | 73/597 |
| 7,496,456 B2 * | 2/2009 | Hiyama et al. | ............ | 702/39 |
| 7,640,809 B2 * | 1/2010 | Shibata et al. | ............ | 73/622 |
| 2006/0260403 A1 | 11/2006 | Waschkies | | |

FOREIGN PATENT DOCUMENTS

| | | |
|---|---|---|
| DE | 10312459 | 7/2004 |
| EP | 0581315 | 2/1994 |
| JP | 59-014189 | 4/1984 |
| JP | 11-132382 | 5/1999 |
| JP | 11-183449 | 7/1999 |
| JP | 2006-326656 | 12/2006 |
| JP | 2007-248457 | 9/2007 |

OTHER PUBLICATIONS

"Chronological Scientific Tables 2006 (desk-size) (Edited by National Astronomical Observatory of Japan, and Published by Maruzen Co., Ltd. on Nov. 30, 2005, p. 418-419)" with English translation of pertinent portion (Three Pages).

* cited by examiner

*Primary Examiner* — J M Saint Surin
(74) *Attorney, Agent, or Firm* — Rankin, Hill & Clark LLP

(57) ABSTRACT

The intensity of first reflected ultrasonic waves reflected from an end of a first electrode tip is measured while the electrode tip is separated from a workpiece. The intensity of second reflected waves reflected from the end of the electrode tip is measured while the electrode tip contacts with the workpiece. Based on the above intensities, an intensity ratio (reflectance) and the fraction of the waves entering the workpiece are determined from the following equations: reflectance=(intensity of second reflected waves)/(intensity of first reflected waves) fraction of waves entering the workpiece=1−reflectance. From a predetermined correlative relationship between a contact area of a region enabling ultrasonic waves to be incident on the workpiece and the determined fraction of the entering waves, a ratio (contact area ratio) is determined between a total area of the region and a contact area of the region contacting with the workpiece.

9 Claims, 8 Drawing Sheets

METHOD OF EVALUATION USING ULTRASONIC WAVES

BACKGROUND OF THE INVENTION

1. Field of the Invention

The present invention relates to a method of evaluating a contact area ratio of an electrode tip when carrying out resistance welding using the electrode tips, a method of evaluating an internal resistance of workpieces, a method of evaluating an attenuation rate of ultrasonic waves, and a method of determining an inclined condition of the electrode tip. The present invention also relates to a method and apparatus for detecting the position of an interface of a molten portion, which is generated when workpieces are placed mutually in abutment and spot welding is carried out thereon.

2. Description of the Related Art

When spot welding, which forms one type of welding technique, is performed, as is well known, workpieces that have been placed mutually in abutment with each other are gripped between a pair of electrode tips, and by causing a current to flow between the electrode tips, welding in the form of spot welds on the workpieces is carried out.

Spot welding typically is performed, for example, by a welding gun, which is arranged at an end of a robot arm of a teachable robot. More specifically, the robot, which has been taught beforehand, is operated (moved) initially so as to enable workpieces to be inserted between electrode tips that are disposed on an openable/closable clamp of the welding gun. Next, by closing the clamp, the workpieces are gripped between the electrode tips. In this state, the electrode tips are energized and current is caused to flow therebetween, whereby a molten portion is formed internally within the workpieces. Lastly, a spot weld is formed on the workpieces accompanying solidification of the molten portion.

In spot welding implemented in the foregoing manner, the growth and solidification of the molten portion, i.e., what timing the molten portion grows and solidifies at, is inspected. As one such detection method, the technique disclosed in Japanese Patent Publication No. 59-014189 is known. More specifically, in this technique, an ultrasonic oscillator for transmitting and receiving ultrasonic waves is incorporated into one of the electrode tips. Ultrasonic waves are transmitted from the ultrasonic oscillator, whereupon the ultrasonic waves are reflected by a reflection-inducing surface disposed on the other remaining electrode tip, and the reflected ultrasonic waves are received by the aforementioned ultrasonic oscillator.

When resistance welding is performed repeatedly with respect to a plurality of workpieces, the electrode tips gradually suffer from wear and abrasion. As a result, the contact areas between the electrode tips and the workpiece undergo change, and along therewith, the area on the electrode tip that is capable of transmitting ultrasonic waves also changes. In the case that such a condition occurs, with the technique of Japanese Patent Publication No. 59-014189, which is premised on the contact area between the electrode tips and the workpiece remaining constant, the detection accuracy of the interface position of the molten portion, and consequently the accuracy in calculating the speed at which the molten portion develops and grows, are deteriorated.

Further, if the technique of Japanese Patent Publication No. 59-014189 is implemented to evaluate what timing the molten portion is growing at, when the electrode tips abut with respect to the workpiece in an inclined condition due to inappropriate teaching of the robot, disagreement between the growth speed estimated when the robot was appropriately taught, and the measured growth speed occurs. In such a case, since the person conducting the evaluation is riot informed that the electrode tips are in abutment with respect to the workpiece in an inclined condition, there is a problem in that it cannot be evaluated whether the growth speed of the molten portion is appropriate or not.

On the other hand, a method and apparatus for detecting the position of an interface of a molten portion, for investigating what timing the molten portion has grown and solidified at, has been proposed in Japanese Laid-Open Patent Publication No. 2007-248457. More specifically, with the detection method and apparatus of Japanese Laid-Open Patent Publication No. 2007-248457, ultrasonic waves are directed toward the molten portion from a transmitter-receiver incorporated into a welding tip, whereby reflected waves that are reflected from the molten portion, or transmissive waves that have passed through the molten portion, are detected.

In the conventional technique of Japanese Laid-Open Patent Publication No. 2007-248457, the molten portion is detected based on a hypothesis that the velocity of ultrasonic waves is constant. However, according to keen and diligent investigations carried out by the present inventors, it has been found that the velocity of such ultrasonic waves actually becomes delayed (i.e., slower) accompanying a rise in the temperature of the workpiece. Accordingly, as the temperature of the workpiece changes following advancement of the spot welding, there is a concern that the detection accuracy in detecting the position of the molten portion may become deteriorated, if only somewhat, using such a conventional technique.

SUMMARY OF THE INVENTION

A general object of the present invention is to provide a method of evaluating a contact area ratio of an electrode tip, which is capable of easily judging that electrode tips have become worn or that inappropriate teaching of a robot has occurred.

A principal object of the present invention is to provide a method of evaluating a contact area ratio of an electrode tip, which enables changes in the condition of workpieces to be evaluated accurately.

Another object of the present invention is to provide a method of evaluating an internal resistance of workpieces, which performs an evaluation based on the aforementioned contact area ratio evaluation method.

Another object of the present invention is to provide a method of evaluating an attenuation rate of ultrasonic waves, which performs an evaluation based on the aforementioned contact area ratio evaluation method.

Another object of the present invention is to provide a method of determining an inclined condition of electrode tips, which performs an evaluation based on the aforementioned contact area ratio evaluation method.

Another object of the present invention is to provide a method of detecting the position of an interface of a molten portion, which is capable of detecting, with greater accuracy, the interface position of the molten portion.

Another object of the present invention is to provide an apparatus for detecting the position of an interface of a molten portion, in order to carry out the aforementioned method of detecting the interface position of the molten portion.

According to one aspect of the present invention, a method of evaluating a contact area ratio of an electrode tip is provided, for determining a ratio between a total area of a region of the electrode tip which can cause ultrasonic waves to be incident on a workpiece to be welded and a contact area at which the region makes contact with respect to the workpiece, the electrode tip for performing resistance welding, the method comprising the steps of:

determining a correlative relationship between the contact area and the fraction of the incident ultrasonic waves that enter the workpiece at the region;

transmitting ultrasonic waves from an ultrasonic oscillator incorporated into the electrode tip in a state in which the electrode tip is separated from the workpiece, and measuring an intensity of first reflected waves that are reflected from an end of the electrode tip; and transmitting ultrasonic waves from the ultrasonic oscillator in a state in which the electrode tip abuts against the workpiece, and determining an intensity of second reflected waves that are reflected from the end of the electrode tip, wherein, after a reflectance, which forms an intensity ratio between the first reflected waves and the second reflected waves, has been determined from the following equation (1-1), the fraction of the incident ultrasonic waves that enter the workpiece is determined from the following equation (1-2), and the contact area at which the region makes contact with respect to the workpiece is determined from the fraction of the incident ultrasonic waves that enter the workpiece and the correlative relationship, and a contact area ratio is determined from the following equation (1-3), reflectance=(intensity of second reflected waves)/(intensity of first reflected waves)  (1-1), fraction of incident waves that enter the workpiece=1−reflectance  (1-2), contact area ratio=(contact area of electrode tip)/(total area of region which can cause ultrasonic waves to be incident on the workpiece)  (1-3).

By performing such calculations, how much of the ultrasonic waves that have transmitted from the electrode tip actually enter the workpieces can be obtained as information. By carrying out corrections based on this information, to what extent the contact state between the workpieces and the electrode tip has changed can be evaluated.

Further, when the intensity ratio and contact area ratio are determined repeatedly directly after initiating resistance welding, in the case that the electrode tip becomes worn, the contact area ratio rises accompanied by lowering of the intensity ratio. By continuously comparing the intensity ratio and the contact area ratio, it can be judged whether or not the amount of wear of the electrode tip is within an allowable range.

Further, concerning the correlative relationship between the fraction of the incident ultrasonic waves that enter the workpiece and the contact area, for example, after ultrasonic waves have been transmitted from the ultrasonic oscillator incorporated into the electrode tip, and an ultrasonic wave intensity distribution of the ultrasonic oscillator has been determined, the total area of the region, which can cause the ultrasonic waves to be incident on the workpiece, is determined by integrating the intensity distribution over a maximal range in which the intensity of the ultrasonic waves is observed, whereas the correlative relationship can be determined by repeatedly integrating the intensity distribution over a range within which the intensity of the ultrasonic waves is observed.

According to another aspect of the present invention, a method of evaluating an internal resistance is provided, for evaluating an instantaneous internal resistance of workpieces that are gripped between a pair of electrode tips and on which resistance welding is carried out, the method comprising the steps of:

determining a total area of a region of the electrode tip which can cause ultrasonic waves to be incident on the workpiece, and a correlative relationship between a contact area at which the region makes contact with respect to the workpiece and the fraction of the incident ultrasonic waves that enter the workpiece at the region;

transmitting ultrasonic waves from an ultrasonic oscillator incorporated into the electrode tip in a state in which the electrode tip is separated from the workpieces, and measuring an intensity of first reflected waves that are reflected from an end of the electrode tip;

transmitting ultrasonic waves from the ultrasonic oscillator in a state in which the electrode tip abuts against the workpieces, and determining an intensity of second reflected waves that are reflected from the end of the electrode tip; and determining a total resistance between the pair of electrode tips, which are in contact with the workpieces, wherein, after a reflectance, which forms an intensity ratio between the first reflected waves and the second reflected waves, has been determined from the following equation (1-4), the fraction of the incident ultrasonic waves that enter the workpiece is determined from the following equation (1-5), wherein, after the contact area at which the region makes contact with respect to the workpiece has been determined from the fraction of the incident ultrasonic waves that enter the workpiece and the correlative relationship, a contact area ratio is determined from the following equation (1-6), and the instantaneous internal resistance of the workpieces is determined from the following equation (1-7), reflectance=(intensity of second reflected waves)/(intensity of first reflected waves)  (1-4), fraction of incident waves that enter the workpiece=1−reflectance  (1-5), contact area ratio=(contact area of electrode tip)/(total area of region which can cause ultrasonic waves to be incident on the workpiece)  (1-6), instantaneous internal resistance=(total resistance between the pair of electrode tips)×(contact area ratio)  (1-7).

More specifically, in this case, the internal resistance of the workpieces can be determined after corrections according to the aforementioned information are performed. Therefore, the internal resistance of the workpieces can be evaluated with greater accuracy.

In this case as well, the correlative relationship between the fraction of ultrasonic waves that enter the workpiece and the contact area may be determined, as discussed above.

According to another aspect of the present invention, a method of evaluating an attenuation rate is provided, for evaluating an attenuation rate of ultrasonic waves within workpieces that are gripped between a first electrode tip and a second electrode tip, and on which resistance welding is carried out, the method comprising the steps of:

transmitting ultrasonic waves from an ultrasonic oscillator incorporated into the first electrode tip, in a state in which both of the first electrode tip and the second electrode tip are separated from the workpieces, and measuring an intensity of first reflected waves that are reflected from an end of the first electrode tip;

transmitting ultrasonic waves from the ultrasonic oscillator in a state in which both of the first electrode tip and the second electrode tip abut against the workpieces, and measuring an intensity of second reflected waves that are reflected from the end of the first electrode tip, together with measuring an intensity of transmissive waves that are incident on a receiver incorporated into the second electrode tip, wherein, after a reflectance has been determined from the following equation (1-8), the fraction of the waves that enter the workpiece is determined from the following equation (1-9), wherein, after a corrected entering wave intensity of ultrasonic waves that enter the workpiece has been determined from the following equation (1-10), a corrected transmissive wave intensity is determined from the following equation (1-11), and wherein, the attenuation rate is determined from the following equation (1-12), reflectance=(intensity of second reflected waves)/(intensity of first reflected waves) (1-8), fraction of incident waves that enter the workpiece=1−reflectance (1-9), corrected entering wave intensity=(intensity of first reflected waves)×(fraction of incident waves that enter the workpiece) (1-10), corrected transmissive wave intensity=(transmissive wave intensity)/(fraction of incident waves that enter the workpiece) (1-11), attenuation rate=1−(corrected transmissive wave intensity)/(corrected entering wave intensity) (1-12).

The ultrasonic waves become attenuated at the interior of the workpieces. However, according to the present invention, the attenuation rate of the ultrasonic waves corresponding to the fraction of the waves that enter the workpiece can be obtained. Taking into consideration such attenuation, changes in the condition of the workpieces can be evaluated with greater accuracy.

According to another aspect of the present invention, a method of determining an inclined condition of an electrode tip is provided, for determining whether or not the electrode tip is inclined with respect to workpieces, when teaching a robot equipped with a welding gun having the electrode tip that performs resistance welding, the method comprising the steps of:

transmitting ultrasonic waves from an ultrasonic oscillator incorporated into the electrode tip in a state in which the electrode tip is separated from the workpieces, and measuring an intensity of first reflected waves that are reflected from an end of the electrode tip;

transmitting ultrasonic waves from the ultrasonic oscillator in a state in which the electrode tip abuts against the workpiece perpendicularly to the workpieces, and determining an intensity of second reflected waves that are reflected from the end of the electrode tip, thereafter inspecting a time-dependent change of a reflectance, defined as an intensity ratio of the first reflected waves and the second reflected waves determined by the following equation (1-13), wherein the time-dependent change of the reflectance is investigated at a time when the electrode tip of the robot on which teaching has been completed abuts against the workpieces, and wherein it is judged that the electrode tip is inclined with respect to the workpieces when a reduction width of the time-dependent change is small compared to a reduction width of the time-dependent change of the reflectance when the electrode tip abuts against the workpiece perpendicularly to the workpieces, whereas it is judged that the electrode tip abuts against the workpiece perpendicularly to the workpieces when the respective reduction widths of the time dependent changes are in agreement with each other, reflectance=(intensity of second reflected waves)/(intensity of first reflected waves) (1-13).

According to the present invention, by investigating the time-dependent change of the reduction width of the intensity ratio (reflectance), or a difference from an appropriate value in the ultrasonic waves at the time when the electrode tip makes contact with respect to the workpieces, it can be judged whether or not teaching was performed appropriately with respect to the robot on which the welding gun is mounted. More specifically, in the case that teaching performed with respect to the robot is appropriate, because the electrode tips become embedded into the workpieces as resistance welding progresses, the contact area of the electrode tips with respect to the workpieces becomes larger. Therefore, because the ultrasonic waves easily enter the workpieces, the intensity ratio decreases greatly with the passage of time.

On the other hand, in the case that teaching performed with respect to the robot is not appropriate and hence the electrode tips abut against the workpieces in an inclined state, even though the electrode tips become embedded into the workpieces as resistance welding progresses, only a portion of the region which can cause ultrasonic waves to be incident on the workpiece becomes embedded, while a residual region also exists in an exposed state. Therefore, the reduction width of the intensity ratio stays small even with the passage of time.

In this manner, by comparing the reduction widths, it can be judged whether teaching has been performed appropriately or not with respect to the robot.

According to the present invention, first, the degree to which the ultrasonic waves transmitted from the electrode tips actually enter the workpieces is calculated, and corrections are carried out based on the result thereof. Consequently, time-dependent changes in the internal resistance of the workpieces, and changes in the condition of the workpieces, can be evaluated with greater accuracy.

In addition, for example, when teaching is performed on a robot on which a welding gun equipped with the electrode tips is mounted, by determining whether or not the electrode tips are inclined, it can be judged whether such teaching has been carried out appropriately.

According to another aspect of the present invention, a method of detecting the position of an interface of a molten portion is provided, for detecting the position of an instantaneous interface of a molten portion, which is generated when workpieces are placed mutually in abutment and spot welding is carried out thereon, the method comprising the steps of:

determining an arrival time from when ultrasonic waves are made incident from a surface of at least one of the workpieces until the ultrasonic waves arrive at the instantaneous interface of the molten portion;

determining an instantaneous velocity of the ultrasonic waves from a transmission time in which the ultrasonic waves are transmitted through the molten portion, and a distance from a surface of one of the workpieces to a surface of another of the workpieces; and detecting the instantaneous interface position of the molten portion by multiplying the instantaneous velocity of the ultrasonic waves by the arrival time.

More specifically, in the present invention, the instantaneous velocity of the ultrasonic waves during detection thereof is determined, and based on the instantaneous velocity, the position of the interface of the molten portion is detected. Stated otherwise, even as the velocity of the ultrasonic waves undergoes change, the position of the interface of the molten portion is detected based on the velocity after such change. Therefore, the position of the molten portion can be detected with greater accuracy.

According to another aspect of the present invention, a method of detecting the position of an interface of a molten portion is provided, for detecting the position of an interface of a molten portion, which is generated when workpieces are placed mutually in abutment and spot welding is carried out thereon, the method comprising the steps of:

transmitting first ultrasonic waves from a first transmitter-receiver of a first welding tip that abuts against a surface of one of the workpieces and toward a second transmitter-receiver of a second welding tip that abuts against a surface of another of the workpieces, together with transmitting second ultrasonic waves from the second transmitter-receiver of the second welding tip and toward the first transmitter-receiver of the first welding tip; and determining a distance F between an end of the first welding tip and the interface of the molten portion from the following equation (2-1), $$F=\{E/[B-(A/2+D/2)]\}\times(C-A)/2 \quad (2\text{-}1)$$

wherein, among the first ultrasonic waves, A is a time required for first reflected waves, which are reflected from an end of the first welding tip, to be emitted from the first transmitter-receiver and return to the first transmitter-receiver, B is a time required for transmissive waves, which have been transmitted through the molten portion, to be emitted from the first transmitter-receiver and reach the second transmitter-receiver, C is a time required for second reflected waves, which are reflected from the interface of the molten portion, to be emitted from the first transmitter-receiver and return to the first transmitter-receiver, and among the second ultrasonic waves, D is a time required for third reflected waves, which are reflected from an end of the second welding tip, to be emitted from the second transmitter-receiver and return to the second transmitter-receiver, and E is a tip interval distance between the first welding tip and the second welding tip.

In the present invention, when detecting the position of the interface of the molten portion, the actual velocity of the ultrasonic waves at that time, or a value that is extremely close thereto, is determined. More specifically, even in the case that the velocity of the ultrasonic waves changes corresponding to the temperature of the workpieces, with the present invention, the actual velocity of the ultrasonic waves at that point in time, or a value that is extremely close thereto, is used in order to detect the position of the interface of the molten portion. Consequently, the interface position of the molten portion can be detected with high accuracy, and as a result, the detection accuracy of the interface position can be improved.

The distance from the first transmitter-receiver to the end of the first welding tip may be different from the distance from the second transmitter-receiver to the end of the second welding tip. In this case, both of these distances are determined, and the distances may be incorporated into the calculations.

More specifically, according to yet another aspect of the present invention, a method of detecting the position of an interface of a molten portion is provided, for detecting the position of an interface of a molten portion, which is generated when workpieces are placed mutually in abutment and spot welding is carried out thereon, the method comprising the steps of:

transmitting first ultrasonic waves from a first transmitter-receiver of a first welding tip that abuts against a surface of one of the workpieces and toward a second transmitter-receiver of a second welding tip that abuts against a surface of another of the workpieces, together with transmitting second ultrasonic waves from the second transmitter-receiver of the second welding tip and toward the first transmitter-receiver of the first welding tip; and determining a distance F between an end of the first welding tip and the interface of the molten portion from the following equation (2-2), $$F=\{E/[B-(1+\gamma)A/2]\}\times(C-A)/2 \quad (2\text{-}2)$$

wherein, among the first ultrasonic waves, A is a time required for first reflected waves, which are reflected from an end of the first welding tip, to be emitted from the first transmitter-receiver and return to the first transmitter-receiver, B is a time required for transmissive waves, which have been transmitted through the molten portion, to be emitted from the first transmitter-receiver and reach the second transmitter-receiver, C is a time required for second reflected waves, which are reflected from the interface of the molten portion, to be emitted from the first transmitter-receiver and return to the first transmitter-receiver, and E is a tip interval distance between the first welding tip and the second welding tip, and wherein a relationship $H=\gamma I$ is established between values H and I, in which $\gamma$ is a proportionality coefficient, and where H is a distance from the first transmitter-receiver to an end of the first welding tip, and I is a distance from the second transmitter-receiver to an end of the second welding tip.

Moreover, either one of the first transmitter-receiver and the second transmitter-receiver can be replaced by a simple receiver. More specifically, according to still another aspect of the present invention, a method of detecting the position of an interface of a molten portion is provided, for detecting the position of an interface of a molten portion, which is generated when workpieces are placed mutually in abutment and spot welding is carried out thereon, the method comprising the steps of:

transmitting ultrasonic waves from a transmitter-receiver of a first welding tip that abuts against a surface of one of the workpieces and toward a receiver of a second welding tip that abuts against a surface of another of the workpieces; and determining a distance F between an end of the first welding tip and the interface of the molten portion from the following equation (2-3), $$F=\{E/[B-A]\}\times(C-A)/2 \quad (2\text{-}3)$$

wherein, among the ultrasonic waves, A is a time required for first reflected waves, which are reflected from an end of the first welding tip, to be emitted from the transmitter-receiver and return to the transmitter-receiver, B is a time required for transmissive waves, which have been transmitted through the molten portion, to be emitted from the transmitter-receiver and reach the receiver, C is a time required for second reflected waves, which are reflected from the interface of the molten portion, to be emitted from the transmitter-receiver and return to the transmitter-receiver, and E is a tip interval distance between the first welding tip and the second welding tip.

In this case as well, similar to the above, when the interface position of the molten portion is detected, the actual velocity, or a value that is extremely close thereto, can be used as the velocity of the ultrasonic waves. Consequently, the interface position of the molten portion can be detected with greater accuracy.

In this case, for example, the first welding tip may have a transmitter-receiver incorporated therein, while the second welding tip has a receiver incorporated therein, and further, the distance from the end of the first welding tip to the transmitter-receiver may be the same as the distance from the end of the second welding tip to the receiver. Alternatively, similar to the case described above, the distance from the end of the first welding tip to the transmitter-receiver and the distance from the end of the second welding tip to the receiver may be determined respectively, and a ratio of the distances may be calculated, and such a ratio may be incorporated into the calculations.

Herein, the transmissive waves, which are capable of being transmitted through the liquid-phase molten portion, are longitudinal waves, while transverse waves cannot pass (be transmitted) through the molten portion and hence are reflected by the molten portion. More specifically, in all cases, measurements may be performed such that all of the reflected waves are measured as transverse waves, whereas the aforementioned transmissive waves are measured as longitudinal waves.

Moreover, since the velocities of such longitudinal and transverse waves differ mutually from each other, in order to carry out the calculations of the aforementioned equations (2-1) through (2-3), it is necessary for the velocity of either of the waves to be converted into the velocity of the other residuary waves.

In accordance with another aspect of the present invention, an apparatus for detecting the position of an interface of a molten portion is provided, for detecting the position of an interface of a molten portion, which is generated when workpieces are placed mutually in abutment and spot welding is carried out thereon, the method comprising:

a first transmitter-receiver, which is capable of transmitting and receiving ultrasonic waves, incorporated into a first welding tip constituting a spot welding apparatus;

a second transmitter-receiver, which is capable of transmitting and receiving ultrasonic waves, incorporated into a second welding tip for performing spot welding together with the first welding tip; and tip interval distance measuring means for measuring a tip interval distance between the first welding tip and the second welding tip, wherein the first transmitter-receiver receives first reflected waves, which are emitted from the first transmitter-receiver and reflected from an end of the first welding tip, and second reflected waves, which are emitted from the first transmitter-receiver and reflected from the interface of the molten portion, and wherein the second transmitter-receiver receives transmissive waves, which are emitted from the first transmitter-receiver and transmitted through the molten portion, and third reflected waves, which are emitted from the second transmitter-receiver and reflected from an end of the second welding tip.

As a result of such a structure, an instantaneous velocity of the transmissive waves, in which momentarily changing temperature and propagation distance are reflected, can easily be determined. Based on the instantaneous velocity, the interface position can be detected with greater accuracy.

Further, in the case that the relationship $H=\gamma I$ is established between values H and I, in which $\gamma$ is a proportionality coefficient, H is a distance from the first transmitter-receiver to an end of the first welding tip, and I is a distance from the second transmitter-receiver to an end of the second welding tip, the distance F may also be calculated in accordance with the aforementioned equation (2-2).

As described above, either of the first transmitter-receiver and the second transmitter-receiver may be replaced by a simple receiver. More specifically, according to still another aspect of the present invention, an apparatus for detecting the position of an interface of a molten portion is provided, for detecting the position of an interface of a molten portion, which is generated when workpieces are placed mutually in abutment and spot welding is carried out thereon, the apparatus comprising:

a transmitter-receiver, which is capable of transmitting and receiving ultrasonic waves, incorporated into a first welding tip constituting a spot welding apparatus;

a receiver, which is capable of receiving ultrasonic waves, incorporated into a second welding tip for performing spot welding together with the first welding tip; and tip interval distance measuring means for measuring a tip interval distance between the first welding tip and the second welding tip, wherein the transmitter-receiver receives first reflected waves, which are emitted from the transmitter-receiver and reflected from an end of the first welding tip, and second reflected waves, which are emitted from the transmitter-receiver and reflected from the interface of the molten portion, and wherein the receiver receives transmissive waves, which are emitted from the transmitter-receiver and transmitted through the molten portion.

In this structure as well, the actual velocity of the ultrasonic waves, or a value that is extremely close thereto, can be determined. Based on such a velocity, the interface position of the molten portion can be detected accurately.

According to the present invention, while taking into consideration that the velocity of the ultrasonic waves changes accompanying changes in the temperature of the workpieces and the welding tips, the actual velocity of the ultrasonic waves, or a value that is extremely close thereto, is determined, whereby based on such a velocity, the interface position of the molten portion is detected. Consequently, the interface position of the molten portion can be detected with high accuracy.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

First, with reference to the accompanying drawings, detailed explanations shall be made of preferred embodiments relating to a method of evaluating a contact area ratio of an electrode tip, a method of evaluating an internal resistance of workpieces, and a method of evaluating an attenuation rate of ultrasonic waves according to the present invention.

When the electrode tips come into contact with the workpieces, the electrode tip has regions (incident capable regions) that can cause ultrasonic waves to be incident on the workpiece, and other regions (incident incapable regions) that, although in contact with the workpiece, cannot cause ultrasonic waves to be incident on the workpiece. Further, even if the entirety of the incident capable regions is in contact with the workpieces, this does not necessarily mean that all of the incident ultrasonic waves will actually enter the workpieces. Consequently, initially, a correlative relationship between a contact area of the incident capable regions with respect to the workpiece and the fraction of the incident ultrasonic waves that enter the workpiece, are determined. Determination of the correlative relationship shall be explained with reference to FIGS. 1 through 3.

Figure 1:
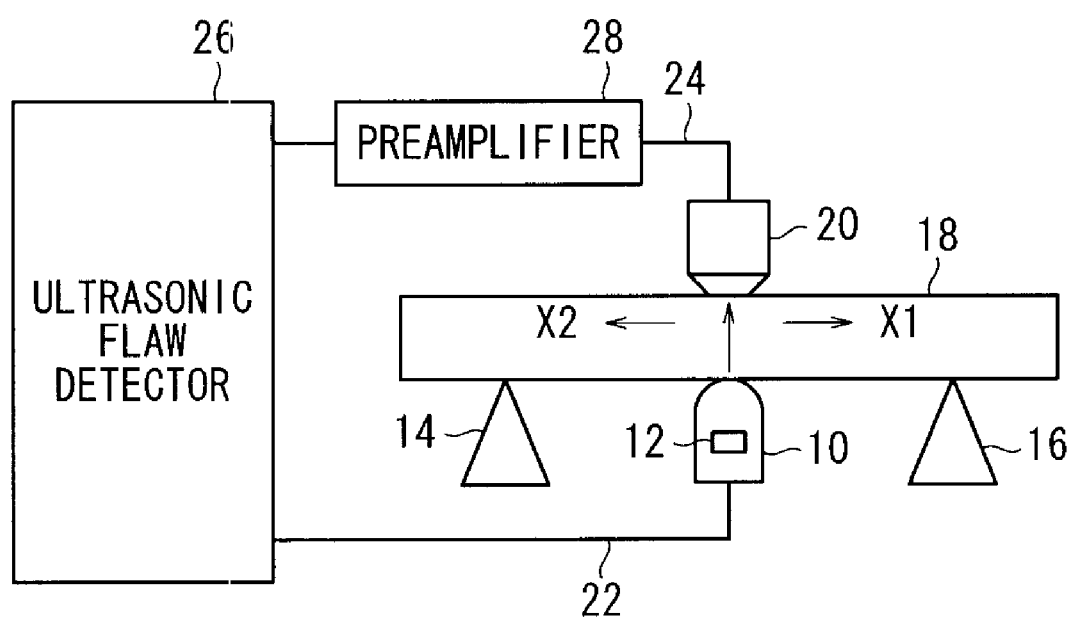
FIG. 1 is a schematic structural view of a measurement apparatus for measuring an intensity distribution of ultrasonic waves.

In FIG. 1, reference numeral 10 indicates an electrode tip. Inside of the electrode tip 10, a transmitter-receiver 12 for both transmitting and receiving ultrasonic waves is embedded therein.

The electrode tip 10 presses with as large a pressing force as practicable against a lower end surface of a medium 18, which is supported by support bodies 14, 16. Further, on the upper end surface of the medium 18, at a location opposed to the electrode tip 10, a sensor 20 is disposed in contact with the medium 18. In this case, the respective centers of the electrode tip 10 and the sensor 20 coincided with each other.

The electrode tip 10 and the sensor 20 are connected electrically through lead wires 22, 24 to an ultrasonic flaw detector 26. Moreover, a preamplifier 28 is interposed in the lead wire 24.

In such a structure, first, ultrasonic waves are transmitted from the transmitter-receiver 12 disposed inside the electrode tip 10. Such ultrasonic waves are made incident on the medium 18 and propagate through the interior of the medium 18 to ultimately reach the sensor 20. An ultrasonic wave signal, which has reached the sensor 20, is amplified by the preamplifier 28 and conveyed as a signal to the ultrasonic flaw detector 26.

The ultrasonic flaw detector 26 recognizes the transmitted signals as an intensity of ultrasonic waves. More specifically, the intensity of ultrasonic waves at the center position of the electrode tip 10 is measured.

Next, the sensor 20 is moved in the direction of the arrow X1 (however, with the sensor 20 being at a position so as not to separate farther away from the electrode tip 10). At this position, the aforementioned ultrasonic wave transmission and intensity measurements are performed.

Thereafter, the sensor 20 is again moved in the direction of the arrow X1, and at the concerned position also, the aforementioned ultrasonic wave transmission and intensity measurements are performed. Similarly in the direction of the arrow X2, the ultrasonic wave transmission and intensity measurements are repeated.

Figure 2:
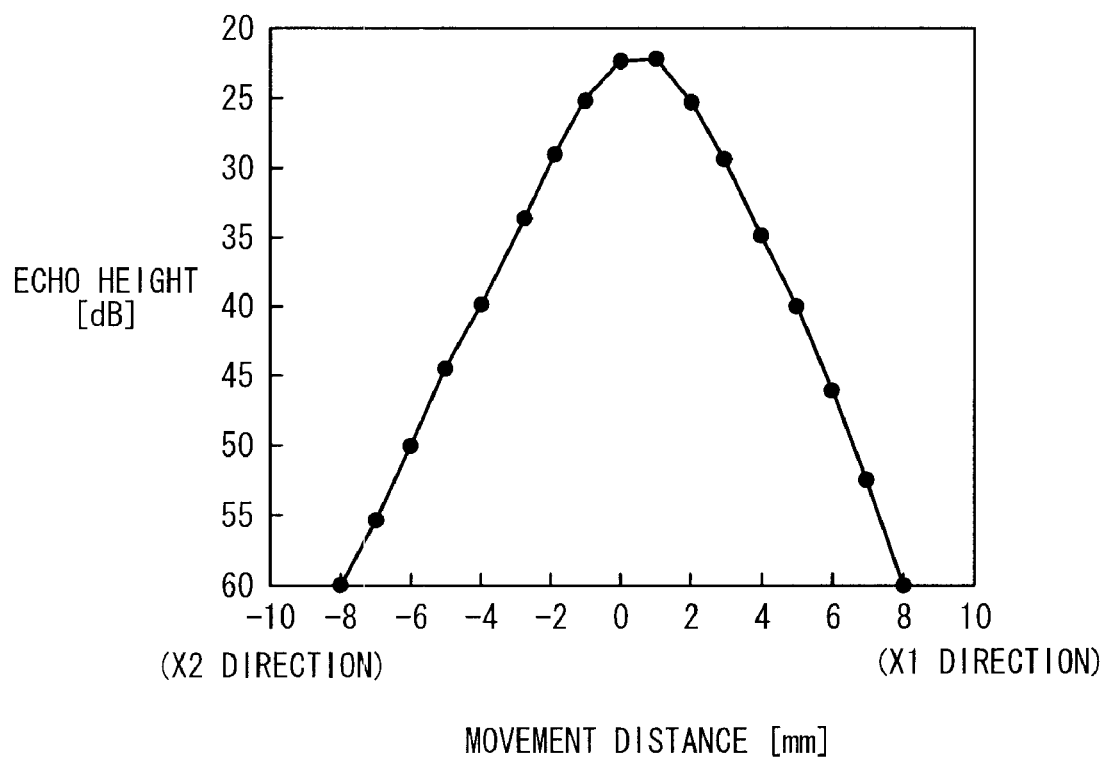
FIG. 2 is a distribution diagram showing an intensity distribution of transmitted ultrasonic waves.

In this manner, a relationship between the separation distance from the center position of the electrode tip 10 and the intensity of the ultrasonic waves is investigated and plotted. An example thereof is shown in FIG. 2. In FIG. 2, on the horizontal axis, zero indicates the center position of the electrode tip 10, the positive numbers indicate the separation distance from the center position in the direction of the arrow X1, and the negative numbers indicate the separation distance from the center position in the direction of the arrow X2. On the other hand, the vertical axis indicates an echo height, which corresponds to the intensity of the ultrasonic waves.

From FIG. 2, it is understood that a region over which the separation distance ranges up to 8 mm from the center represents the incident capable region which can cause the ultrasonic waves to be incident on the workpiece, whereas in the ultrasonic waves, an intensity distribution is exhibited in which the intensity becomes reduced as the separation from the center increases.

Herein, generally, the area is determined by integrating the distance between two points. Similarly, in the present embodiment, integration is performed from one end portion to the other end portion of the incident capable region. More specifically, in the case of the example shown in FIG. 2, integration is performed between −8 mm and +8 mm. In this manner, the total area of the incident capable region of the electrode tip 10 with respect to the medium 18, and the percentage (the fraction of the incident ultrasonic waves that enters the medium) of the ultrasonic waves that enter the medium 18 with respect to the total amount of ultrasonic waves, are determined.

Further, for example, if integration is performed between −0.5 mm and +0.5 mm, the contact area and the fraction of the incident ultrasonic waves that enter the medium 18 within this interval are calculated. Similarly, integration is performed over a range of suitable intervals, for example, of −1 mm to +1 mm, −2 mm to +2 mm, and the like, and the contact area and the fraction of the incident ultrasonic waves that enter the medium 18 within this interval are calculated.

Figure 3:
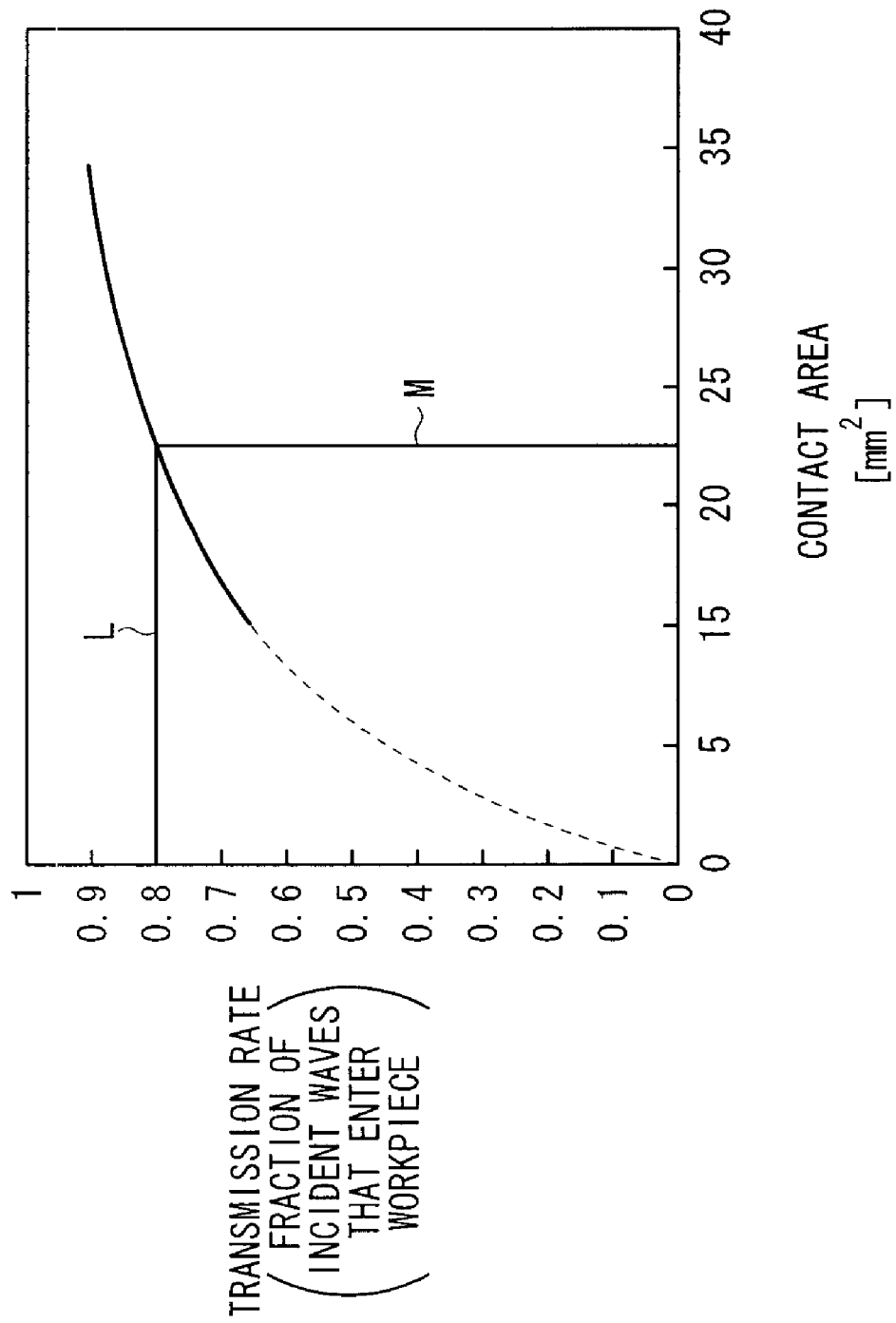
FIG. 3 is a graph showing a correlative relation between the fraction of ultrasonic waves that enter the workpiece and contact area, determined by integrating the intensity distribution of FIG. 2.

When the contact area and the fraction of the incident ultrasonic waves that enter the medium, determined in the above manner, are plotted, the curve shown in FIG. 3, more specifically, a correlative relationship between the contact area of the electrode tip 10 and the rate of the entering ultrasonic waves is obtained.

Next, a method for evaluating the contact area and the like of electrode tips with respect to workpieces, by using the correlative relationship obtained in the foregoing manner, shall be explained.

Figure 4:
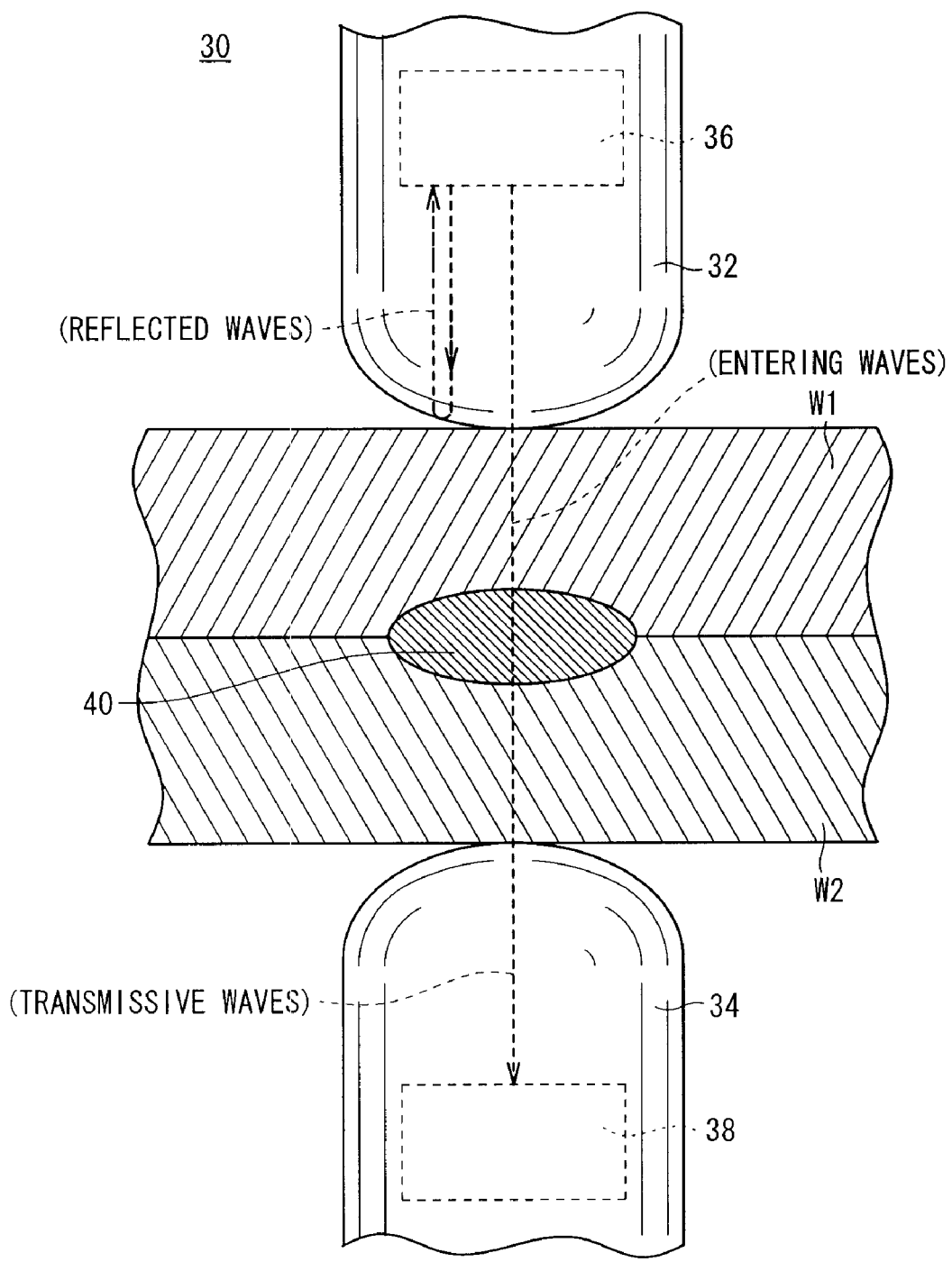
FIG. 4 is a schematic structural view showing essential parts of a spot welding apparatus.

FIG. 4 is a schematic structural view showing essential parts of a spot welding apparatus 30 that forms a resistance welding apparatus. The spot welding apparatus 30 includes a non-illustrated welding gun, which is capable of opening and closing, and which is arranged on an end of a non-illustrated robot arm. A first electrode tip 32 and a second electrode tip 34, which are configured in the same manner as the above-mentioned electrode tip 10, are disposed in a mutually confronting relation on an end of the welding gun. As shown in FIG. 4, the first electrode tip 32 and the second electrode tip 34 grip two workpieces W1, W2 therebetween, such that the workpieces W1, W2 are stacked mutually together in two layers. Accordingly, the end of the first electrode tip 32 abuts against the upper workpiece W1, whereas the second electrode tip 34 abuts against the lower workpiece W2.

A transmitter-receiver 36, which is capable of both transmitting and receiving ultrasonic waves, is internally installed (incorporated into) the first electrode tip 32. Apart therefrom, a receiver 38, which is capable of receiving ultrasonic waves, is internally installed (incorporated into) the second electrode tip 34.

The transmitter-receiver 36 and the receiver 38 are connected to a non-illustrated echo-measuring device. The echo-measuring device is capable of measuring the intensity of ultrasonic waves (reflected waves) that are returned to the transmitter-receiver 36, or the intensity of the ultrasonic waves (transmissive waves) that arrive at the receiver 38.

In the above-mentioned structure, first, an evaluation of the contact area ratio of the electrode tips is implemented in the following manner.

Initially, ultrasonic waves are transmitted from the transmitter-receiver 36 inside the first electrode tip 32. At this point in time, the first electrode tip 32 does not abut against the workpiece W1. Accordingly, all of the ultrasonic waves which have arrived at the end of the first electrode tip 32 are reflected due to the medium of atmosphere or vacuum, which exhibits a large difference in acoustic impedance, and are returned as first reflected waves to the transmitter-receiver 36. The intensity of the first reflected waves is measured by the echo-measuring device.

Next, by moving the robot, the mutually stacked workpieces W1, W2 are inserted between the first electrode tip 32 and the second electrode tip 34 of the welding gun. Of course, at this time, the welding gun is in an opened condition, and accordingly, the first electrode tip 32 and the second electrode tip 34 are maximally separated.

Subsequently, the welding gun is closed, and the end of the first electrode tip 32 is brought into abutment against the upper workpiece W1, while the end of the second electrode tip 34 is brought into abutment against the lower workpiece W2. Specifically, the workpieces W1, W2 are sandwiched and gripped between the first electrode tip 32 and the second electrode tip 34.

Next, a voltage is applied to the first electrode tip 32 and the second electrode tip 34, whereupon the first electrode tip 32 and the second electrode tip 34 are energized. Naturally, along therewith, current flows through the interior of the workpieces W1, W2, and as a result, at the boundary of the interfaces W1 and W2, a molten portion 40 is formed.

Further, simultaneously with being energized, ultrasonic waves are transmitted again from the transmitter-receiver 36. At this time, a portion of the ultrasonic waves enter the workpiece W1 from the region on the end of the first electrode tip 32, which is in abutment with respect to the workpiece W1. On the other hand, even if there is a region on the first electrode tip 32 (also referred to below as an ultrasonic wave incident capable region) which could cause ultrasonic waves to be incident on the workpiece W1, when such a region is not in abutment with respect to the workpiece W1, at such a region the ultrasonic waves are reflected. Further, even though ultrasonic waves have reached a region in abutment with respect to the workpiece W1, a portion thereof actually do not enter the workpiece, but are reflected. Second reflected waves are generated as a result of such reflections, and the second reflected waves are returned to the transmitter-receiver 36.

The second reflected waves are received by the transmitter-receiver 36. The aforementioned echo-measuring device then measures the intensity of the second reflected waves at this time.

From the intensities of the first reflected waves and the second reflected waves measured in the foregoing manner, an intensity ratio is determined, as indicated by the following equation (1-14).

$$\text{intensity ratio} = \text{(intensity of second reflected waves)}/\text{(intensity of first reflected waves)} \quad (1\text{-}14)$$

By determining the intensity ratio, ultimately, the reflectance of the ultrasonic waves at a time when the first electrode tip 32 abuts against the workpiece W1 is determined.

Herein, for example, in the case of an operational (movement) defect of the welding gun, such that even though the welding gun is closed, the first electrode tip 32 does not come into abutment against the workpiece W1, all of the ultrasonic waves are reflected at the end of the first electrode tip 32. Consequently, the intensity of the second reflected waves equals the intensity of the first reflected waves, and the intensity ratio, or stated otherwise the reflectance, determined by the aforementioned equations (1-14) becomes 1.

In contrast thereto, in the case that the first electrode tip 32 abuts against the workpiece W1, ultrasonic waves enter the workpiece W1. In this case, if the intensity of the second reflected waves were zero, then the intensity ratio (reflectance) also would become zero, and it could be assumed that all of the ultrasonic waves enter the workpiece W1. In such a case, in the present embodiment, the ultrasonic wave incident capable region on the first electrode tip 32 is in contact with the workpiece W1 over the entirety thereof, and it is evaluated that the total area of the ultrasonic wave incident capable region is equal to the contact area.

Actually, directly after the first electrode tip 32 and the second electrode tip 34 have come into abutment against the workpieces W1, W2 and have been energized, the temperature of the workpieces W1, W2 does not rise substantially. Owing thereto, at this time, the workpieces W1, W2 are not softened, and consequently, only the extreme end of the first electrode tip 32 is in abutment therewith. More specifically, the entire area of the ultrasonic wave incident capable region on the first electrode tip 32 is not necessarily in abutment with the workpieces. As can be appreciated from this fact, in particular, immediately after spot welding is initiated, the entire area of the ultrasonic wave incident capable region is not necessarily equivalent to the contact area.

Consequently, based on the intensity ratio (reflectance), the fraction of the incident ultrasonic waves that enter the workpiece W1 is determined by the following equation (1-15).

$$\text{(fraction of the incident ultrasonic waves that enter the workpiece)} = 1 - \text{(intensity ratio)} = 1 - \text{(intensity of second reflected waves)}/\text{(intensity of first reflected waves)} \quad (1\text{-}15)$$

For example, in the case that the intensity of the first reflected waves and the intensity of the second reflected waves are, respectively, 100 and 20, the intensity ratio as calculated in accordance with the above equation (1-14) is 0.2. This implies that 20% of the ultrasonic waves emitted from the transmitter-receiver 36 are reflected as second reflected waves.

Additionally, in this case, according to equation (1-15), the fraction of the incident ultrasonic waves that enter the workpiece is determined to be 0.8. That is, in this case, 80% of the emitted ultrasonic waves enter the workpiece W1.

Based on the fraction of the ultrasonic waves that enter the workpiece of 80%, from the correlative relationship shown in FIG. 3, the contact area on the end of the first electrode tip 32 with respect to the workpiece W1 is determined. More specifically, a horizontal line L is drawn from the 80% position on the vertical axis of FIG. 3, and thereafter, from the intersection between the horizontal line L and the curve, a vertical line M is drawn to the horizontal axis. The intersection between the horizontal axis and the vertical line M is taken to be the contact area.

On the other hand, the total area of the incident capable region of the first electrode tip 32 is determined beforehand as described above using the electrode tip 10, which has the same configuration as the first electrode tip 32. Consequently, a contact area ratio is determined from the following equation (1-16).

contact area ratio=(contact area of electrode tip)/(total area of region which can cause ultrasonic waves to be incident on the workpiece) (1-16)

As can be appreciated from equation (1-16), the contact area ratio is defined by a ratio between the total area of the ultrasonic wave incident capable region on the first electrode tip 32, and the contact area at which the first electrode tip 32 is in contact with respect to the workpiece W1.

In this manner, in the present embodiment, in the case that a portion of the ultrasonic waves enters the workpiece W1, whereas a residual part thereof is reflected at the end of the first electrode tip 32, a portion of the incident capable region on the first electrode tip 32 is determined to be separated from the workpiece W1, and an evaluation is performed on the premise that energization is carried out only from the region that is in contact with the workpiece W1.

By carrying out such an evaluation, it can be evaluated whether the first electrode tip 32 has become worn. When the first electrode tip 32 is worn, the intensity ratio decreases, and together therewith, the contact area ratio increases. For example, by comparing both the intensity ratio and the contact area ratio immediately after initiating spot welding, it can be judged whether the amount of wear of the first electrode tip 32 is within an allowable range.

Of course, the intensity ratio and the contact area ratio may be calculated continuously during spot welding, and in the case that the intensity ratio becomes greater than a predetermined value, or if the contact area ratio becomes lower than a predetermined value, the amount of wear on the first electrode tip 32 may also be determined to have exceeded the allowable range.

Further, by carrying out such an evaluation, it can be determined whether or not suitable teaching has been performed with respect to the robot. More specifically, in the case that the robot has been properly taught, as shown in FIG. 4, the first electrode tip 32 and the second electrode tip 34 abut against the workpieces W1, W2 while extending in a perpendicular direction with respect to the workpieces W1, W2.

Figure 5:
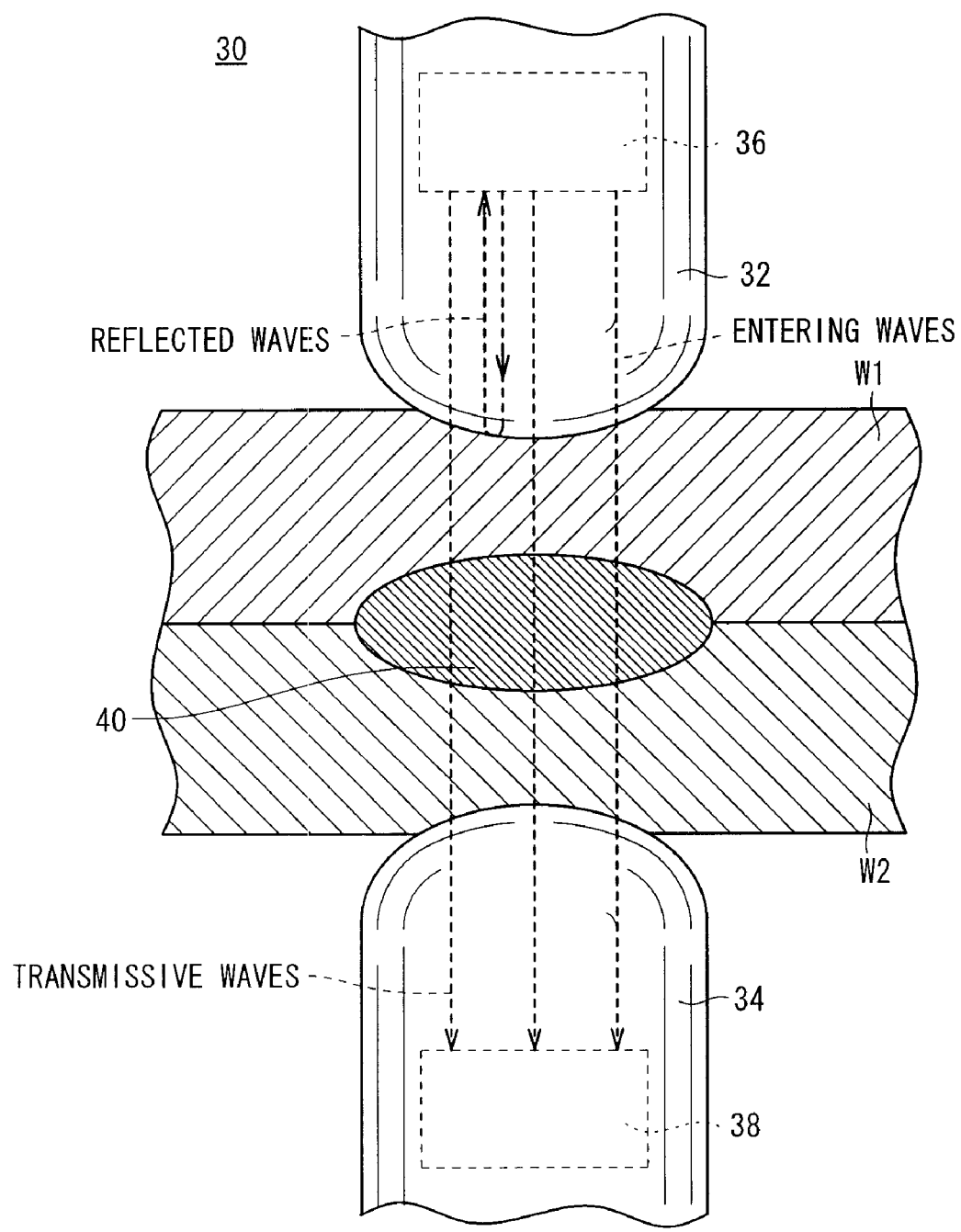
FIG. 5 is a schematic structural view of essential parts, showing a condition in which ends of electrode tips are embedded into workpieces during advancement of spot welding.

When energization advances and the temperature of the workpieces W1, W2 has risen sufficiently, the workpieces W1, W2 become softened. As a result, as shown in FIG. 5, the ends of the first electrode tip 32 and the second electrode tip 34 become embedded somewhat into the workpieces W1, W2, and along therewith, the contact area of the ultrasonic incident capable region enlarges with respect to the workpiece W1. Accordingly, the reflectance determined by the above equation (1-14) becomes smaller with the passage of time.

Figure 6:
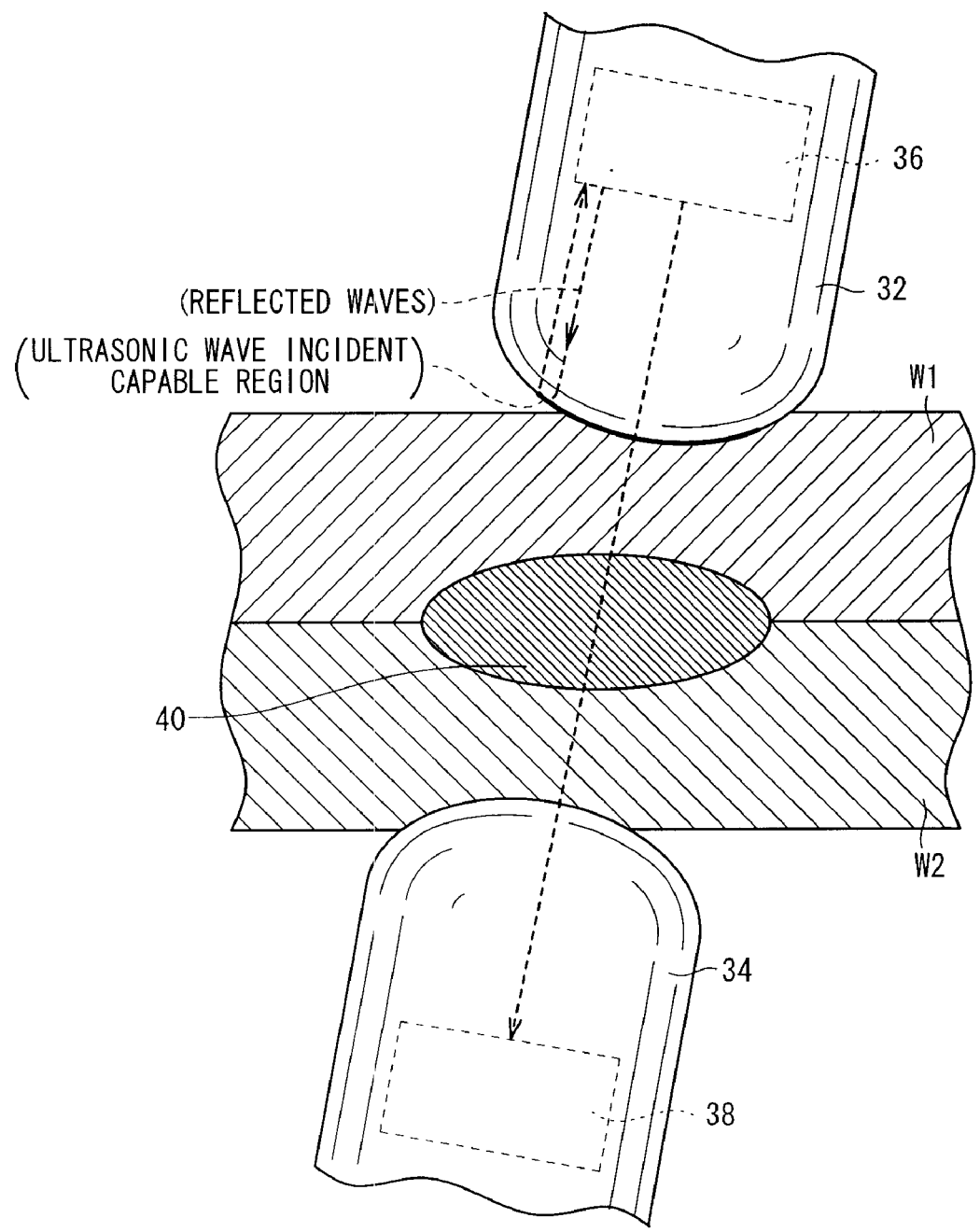
FIG. 6 is a schematic structural view of essential parts, showing an embedded condition in which ends of the electrode tips are inclined with respect to the workpieces.

On the other hand, if proper teaching has not been performed with respect to the robot, as a result thereof, in the case that the first electrode tip 32 and the second electrode tip 34 are in an inclined state with respect to the workpieces W1, W2, although the ends of the first electrode tip 32 and the second electrode tip 34 become embedded into the workpieces W1, W2 as shown in FIG. 6, the ultrasonic wave incident capable region is not fully embedded. Accordingly, even with the passage of time, the reduction width of the reflectance becomes small.

Such a tendency becomes prominent as the angle of inclination of the first electrode tip 32 with respect to the workpiece W1 becomes large. Accordingly, at a previously known condition of the angle of inclination of the first electrode tip 32 with respect to the workpiece W1, a relationship between the angle of inclination and a time-dependent change of the reduction width of the reflectance is registered (recorded), and by referring to such a record and the time-dependent change of the reduction width of the reflectance, during spot welding in which the angle of inclination is not yet known, the unknown angle of inclination can be determined. Owing thereto, it can be determined in what way the teaching carried out with respect to the robot should be corrected.

Further, the instantaneous internal resistance of the workpieces W1, W2 can be evaluated in the following manner.

The resistance during spot welding is the summation of the contact resistance between the first electrode tip 32 and the workpiece W1, the instantaneous internal resistance of the workpieces W1, W2, and the contact resistance between the second electrode tip 34 and the workpiece W2. Accompanying advancement of spot welding, as the contact area of the ultrasonic wave incident capable region becomes greater (see FIG. 5), the contact resistance between the first electrode tip 32 and the workpiece W1, as well as the contact resistance between the second electrode tip 34 and the workpiece W2, both become smaller.

Accordingly, based on the contact area ratio, as determined from the above equations (1-14) to (1-16), the instantaneous internal resistance of the workpieces W1, W2 can be determined from the following equation (1-17).

instantaneous internal resistance of workpieces $W1$, $W2$=(total resistance between first electrode tip 32 and second electrode tip 34)×(contact area ratio) (1-17)

Figure 7:
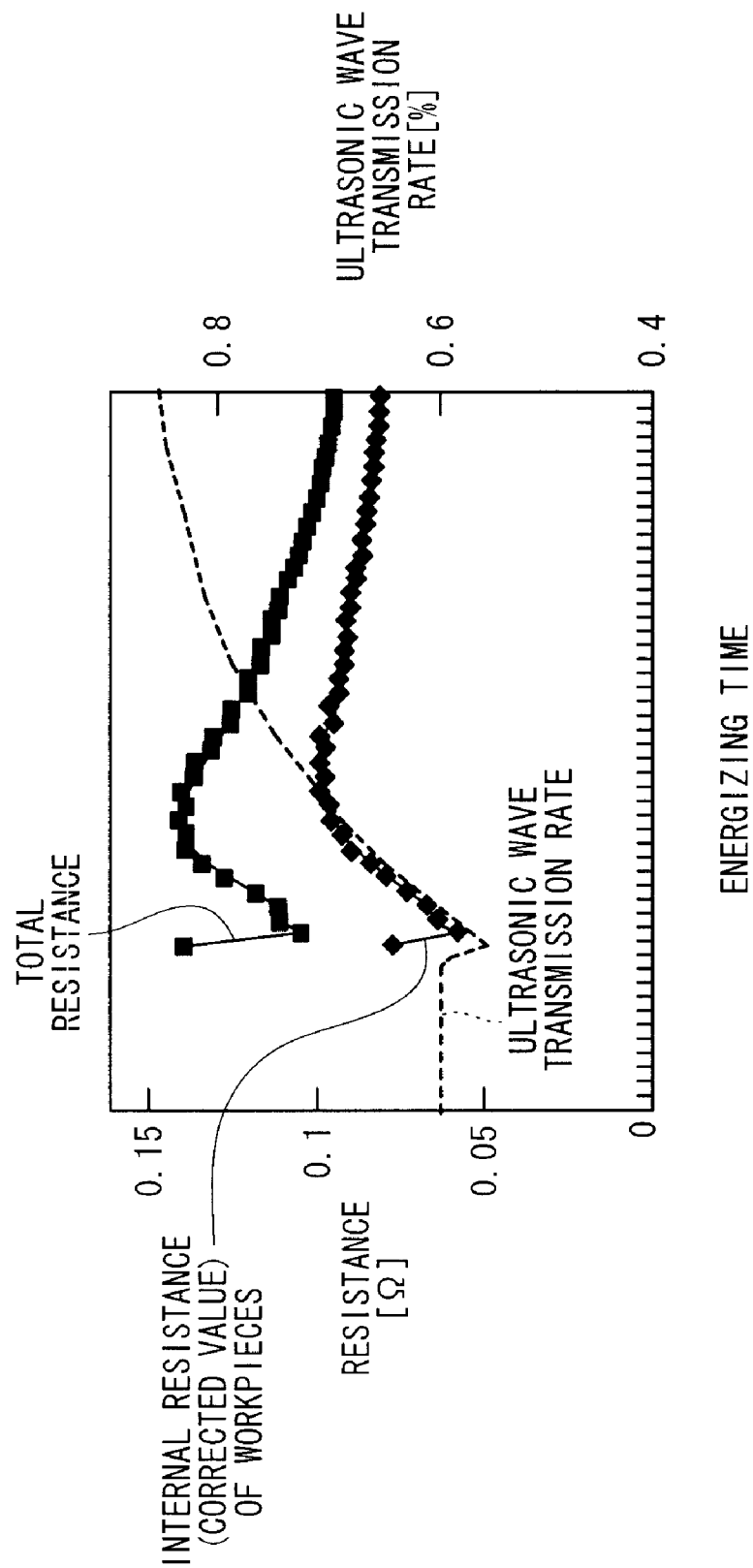
FIG. 7 is a graph showing a total resistance prior to correction, and time-dependent changes in the internal resistance of workpieces determined in accordance with corrections.

FIG. 7 is a graph showing the total resistance between the first electrode tip 32 and the second electrode tip 34, and the time-dependent change in the internal resistance of workpieces W1, W1 as determined according to equation (1-17). In this manner, by performing corrections taking into consideration the contact area ratio of the ultrasonic wave incident capable region on the first electrode tip 32, the instantaneous internal resistance of the workpieces W1, W2 can be evaluated with high accuracy.

Further, the ultrasonic waves are subject to attenuation within the interior of the workpieces W1, W2. In this case, without considering such attenuation, an accurate evaluation cannot easily be performed. Consequently, the attenuation of ultrasonic waves inside the workpieces W1, W2 is determined in the following manner.

First, the reflectance is determined from the above equation (1-14). The reflectance determined in this manner is subtracted from 1. Stated otherwise, if the calculation according to equation (1-15) is performed, the fraction of the ultrasonic waves that enter the workpiece W1 is obtained.

Next, a corrected entering wave intensity of the ultrasonic waves that enter the workpiece W1 is determined from the following equation (1-18).

corrected entering wave intensity=(intensity of first reflected waves)×(fraction of waves that enter the workpiece) (1-18)

Furthermore, a corrected transmissive wave intensity is determined from the following equation (1-19).

corrected transmissive wave intensity=(transmissive wave intensity)/(fraction of waves that enter the workpiece) (1-19)

Herein, transmissive waves are defined as ultrasonic waves, which are transmitted from the transmitter-receiver 36, pass through the workpieces W1, W2, and are received by the receiver 38.

Based on the corrected entering wave intensity and the corrected transmissive wave intensity, which have been determined as described above, the attenuation rate is determined from the following equation (1-20).

attenuation rate=1−(corrected transmissive wave intensity)/(corrected entering wave intensity)  (1-20)

For example, in the case that the intensity of the first reflected waves is 300, the intensity of the second reflected waves is 60, and the intensity of the transmissive waves is 160, since the intensity of the transmissive waves is 160 in contrast to the intensity of 300 of the incident waves, the apparent attenuation rate is 1−160/300=0.47. However, such an attenuation rate does not take into consideration to what degree, from among the incident ultrasonic waves, the ultrasonic waves actually enter the workpiece W1.

On the other and, for example, according to the above-mentioned equations (1-14), (1-15), and (1-18) through (1-20), the following values are determined:

reflectance=60/300=0.2 fraction of incident waves that enter the workpiece=1−0.2=0.8 corrected entering wave intensity=300×0.8=240 corrected transmissive wave intensity=160/0.8=200 attenuation rate=1−200/240=0.17

In this manner, the attenuation rate can be determined more accurately, by determining the attenuation rate while taking into consideration to what degree the ultrasonic waves actually enter the workpiece W1 from among the emitted ultrasonic waves. Further, by carrying out evaluations based on the ultrasonic waves while considering the attenuation rate thereof, change in the internal resistance of the workpieces W1, W2, or change in the interface position of the molten portion 40, can be evaluated more precisely.

Next, a method of detecting an interface position of a molten portion according to the present invention, while presenting a preferred embodiment in relation to a detection apparatus for carrying out such a method, shall be described in detail with reference to the accompanying drawings.

Figure 8:
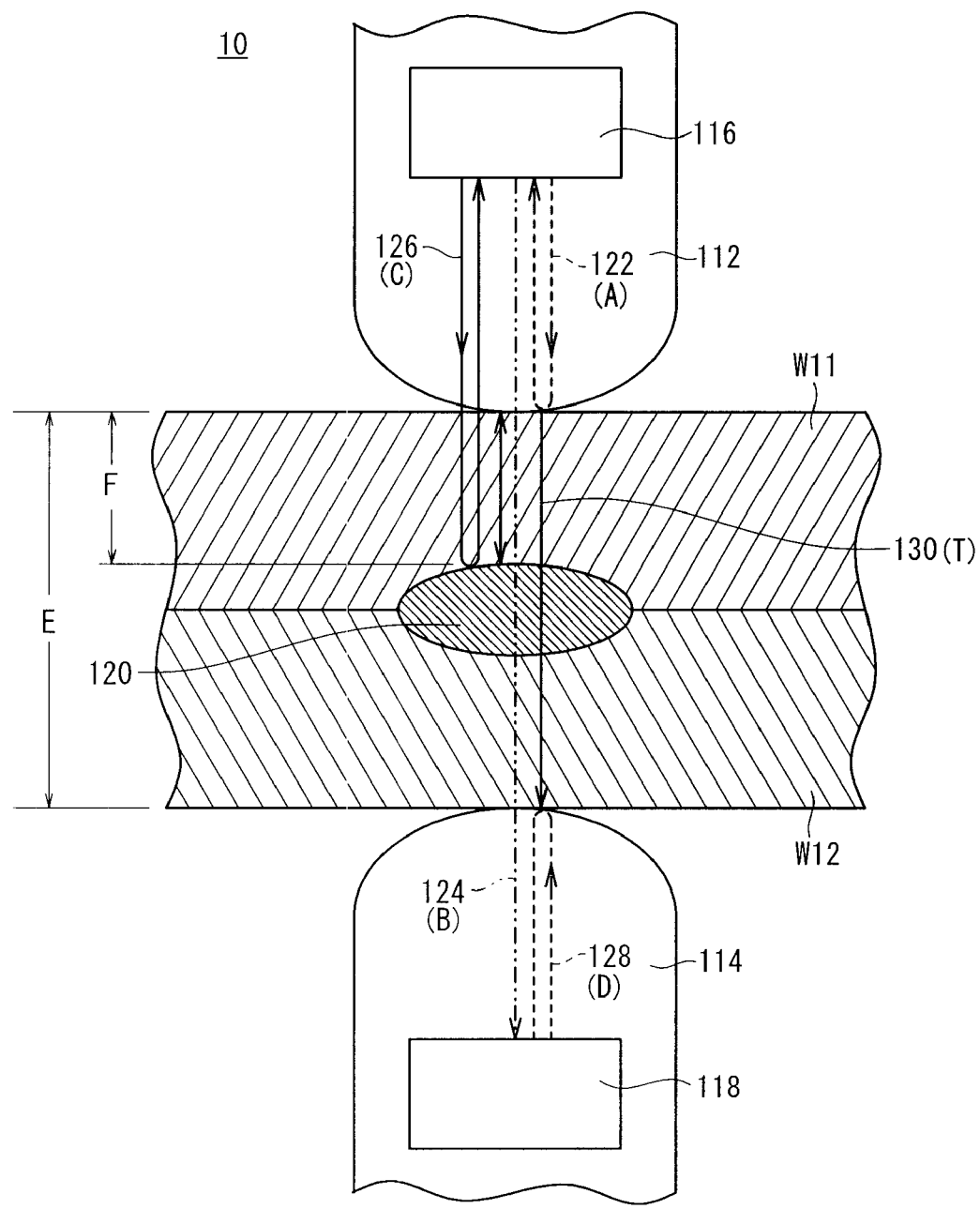
FIG. 8 is a schematic structural view showing essential parts of an apparatus for detecting the interface position of a molten portion according to an embodiment of the invention.

FIG. 8 is a schematic view of essential parts of a molten portion interface position detecting apparatus (hereinafter, also referred to more simply as a detection apparatus) 110 according to the present embodiment. The detection apparatus is attached to a spot welding apparatus.

The spot welding apparatus includes a welding gun (not shown), which is capable of opening and closing, and which is disposed on an end of a non-illustrated robot arm. A first welding tip 112 and a second welding tip 114 are provided at a distal end of the welding gun. As shown in FIG. 8, the first welding tip 112 and the second welding tip 114 sandwich and grip therebetween two mutually stacked workpieces W11 and W12. In accordance therewith, an end of the first welding tip 112 abuts against the upper workpiece W11, whereas the second welding tip 114 abuts against the lower workpiece W12.

A first transmitter-receiver 116 and a second transmitter-receiver 118 are mounted internally, respectively, within the first welding tip 112 and the second welding tip 114. The first transmitter-receiver 116 and the second transmitter-receiver 118 are capable of transmitting and receiving ultrasonic waves. In the following descriptions, ultrasonic waves transmitted from the first transmitter-receiver 116 are designated as first ultrasonic waves, and ultrasonic waves transmitted from the second transmitter-receiver 118 are designated as second ultrasonic waves.

In the welding gun, a non-illustrated encoder is provided for measuring the separation distance between the end of the first welding tip 112 and the end of the second welding tip 114, or stated otherwise, the tip interval distance. The tip interval distance is measured continuously by the encoder. The encoder, together with the first transmitter-receiver 116 and the second transmitter-receiver 118, constitute the detection apparatus 110.

As described above, the end of the first welding tip 112 abuts against the upper workpiece W11 and the end of the second welding tip 114 abuts against the lower workpiece W12. Consequently, the tip interval distance is substantially equal to the sum of the widthwise dimensions of the workpieces W11 and W12 in the thickness direction.

The method for detecting the interface position of the molten portion according to the present embodiment is implemented in the following manner using the detecting apparatus, which is constructed as described above.

At first, the mutually stacked workpieces W11, W12 are inserted between the first welding tip 112 and the second welding tip 114 of the welding gun. Naturally, at this point in time, the welding gun is opened, and accordingly, the first welding tip 112 and the second welding tip 114 are separated maximally from each other.

Thereafter, the welding gun is closed and the end of the first welding tip 112 abuts against the upper workpiece W11, together with the end of the second welding tip 114 abutting against the lower workpiece W12. That is, the workpieces W11, W12 are gripped between the first welding tip 112 and the second welding tip 114.

Next, a voltage is applied to the first welding tip 112 and the second welding tip 114, whereby current is made to flow between the first welding tip 112 and the second welding tip 114. Of course, accompanying energization thereof, current passes through the interior of the workpieces W11, W12, and the interface between the workpieces W11, W12 is then melted. More specifically, a molten portion 120 begins to be formed. As described below, in the present embodiment, a distance F from the top end surface of the upper workpiece W11 to the interface of the molten portion 120 is determined.

In addition, substantially simultaneously with operation of the welding gun, first ultrasonic waves and second ultrasonic waves are transmitted, respectively, from both the first transmitter-receiver 116 and the second transmitter-receiver 118.

Both transverse waves and longitudinal waves are included in the first ultrasonic waves. Among such waves, a portion of the transverse waves are reflected at the end of the first welding tip 112 and become first reflected waves 122. The time required for such first reflected waves 122 to be emitted (transmitted) from the first transmitter-receiver 116 and then return to the first transmitter-receiver 116 is defined as a time A.

Further, transmissive waves 124 are longitudinal waves, which are capable of penetrating and passing through the molten portion 120 that is in a liquid phase, such transmissive waves 124 ultimately reaching the second transmitter-receiver 118. The time required for the transmissive waves 124 to be emitted from the first transmitter-receiver 116 until reaching the second transmitter-receiver 118 is defined as a time B.

On the other hand, even if there are transverse waves that enter into the interior of the workpiece W11 without being reflected at the end of the first welding tip 112, such transverse waves do not penetrate through the molten portion 120 that is in the liquid phase. More specifically, such transverse waves are reflected at the interface of the molten portion 120, becoming second reflected waves 126. The time required in total for the second reflected waves 126 to be emitted (transmitted) from the first transmitter-receiver 116, be reflected at the interface of the molten portion 120, and then return to the first transmitter-receiver 116 is defined as a time C.

In a similar manner, a portion of the transverse waves of the second ultrasonic waves as well are reflected at the end of the second welding tip 114, whereby third reflected waves 128 are generated. The time required for the third reflected waves 128 to be transmitted from the second transmitter-receiver 118 and then return to the second transmitter-receiver 118 is defined as a time D.

Reference numeral 130 in FIG. 8 indicates workpiece interior transmissive waves that are transmitted through the workpieces W11, W12. The time required for such workpiece interior transmissive waves 130 to start out from the upper end surface of the workpiece W11 until reaching the lower end surface of the workpiece W12 is defined as a time T.

Herein, the letter E signifies the sum of the dimensions in the thickness direction of the workpieces W11, W12, or stated otherwise, the tip interval distance, $\alpha$ signifies the transmissive wave instantaneous velocity of the transmissive waves 124, $\beta$ signifies the time from emission of the transmissive waves 124 from the end of the first welding tip 112 until reaching the interface of the molten portion 120, and F signifies the distance from the upper surface of the upper workpiece W11 to the interface of the molten portion 120. Among these values, the distance F is determined by multiplying the instantaneous velocity of the transmissive waves 124 times the time $\beta$. That is, the following equation (2-4) is satisfied.

$$F=\alpha \times \beta \qquad (2\text{-}4)$$

Next, the values $\alpha$ and $\beta$ in equation (2-4) are determined.

The instantaneous velocity $\alpha$ of the workpiece internal transmissive waves 130 is calculated from the following equation (2-5), based on the tip interval distance E and the time T defined as described above.

$$\alpha=E/T \qquad (2\text{-}5)$$

The time T is determined by subtracting both the time until the first ultrasonic waves reach the end of the first welding tip 112 and the time for the transmissive waves 124 to travel from the end of the second welding tip 114 until reaching the second transmitter-receiver 118, from the time B required for the longitudinal waves (transmissive waves 124) included within the first ultrasonic waves emitted from the first transmitter-receiver 116 to pass through the workpieces W11, W12 and reach the second transmitter-receiver 118.

The time until the first ultrasonic waves reach the end of the first welding tip 112 is one half the time required for the first reflected waves 122 to be emitted from the first transmitter-receiver 116 and then return to the first transmitter-receiver 116, or stated otherwise, is defined by A/2. Further, the time for the transmissive waves 124 to travel from the end of the second welding tip 114 until reaching the second transmitter-receiver 118 is the same as the time for the second ultrasonic waves to reach the end of the second welding tip 114, or stated otherwise, is equal to one half (D/2) of the time required for the third reflected waves 128 to be transmitted from the second transmitter-receiver 118 and then return to the second transmitter-receiver 118. That is, the following equation (2-6) is satisfied.

$$T=B-(A/2+D/2) \qquad (2\text{-}6)$$

The above equation (2-6) is substituted into the above equation (2-5) to obtain the following equation (2-7).

$$\alpha=E/[B-(A/2+D/2)] \qquad (2\text{-}7)$$

Further, $\beta$ is determined by subtracting the time required for the first reflected waves 122 to be transmitted from the first transmitter-receiver 116 until returning to the first transmitter-receiver 116, from the time required for the second reflected waves 126 to be transmitted from the first transmitter-receiver 116 and thereafter be reflected by the molten portion 120 until returning to the first transmitter receiver 116, and further by taking one half of such a difference. Stated otherwise, the following equation (2-8) is satisfied.

$$\beta=(C-A)/2 \qquad (2\text{-}8)$$

If equations (2-7) and (2-8) are substituted into equation (2-4), the following equation (2-9) is obtained.

$$F=\{E/[B-(A/2+D/2)]\}\times(C-A)/2 \qquad (2\text{-}9)$$

Further, since the respective velocities of the longitudinal waves (transmissive waves) and the transverse waves (reflected waves) differ from each other, when each of the aforementioned calculations is performed, either one of the velocities must be converted.

Accompanying advancement of spot welding, the molten portion 120 grows. In the case that the interface position of the growing molten portion 120 is required to be detected again, the aforementioned calculations are once again implemented. More specifically, the calculations from equations (2-4) to (2-9) are implemented repeatedly each time the interface position of the molten portion 120 is detected. This is because accompanying growth of the molten portion 120, when the temperature of the workpieces W11, W12 rises, the instantaneous velocity of the ultrasonic waves also changes.

By performing the above calculations in this manner each time the interface position of the molten portion 120 is detected, even under a condition in which the velocity of the transmissive waves 124 changes accompanying a change in temperature of the welding region, based on the instantaneous velocity $\alpha$ depending on the temperature, the interface position of the molten portion 120 (the distance F from the upper end surface of the upper workpiece W11 until the interface of the molten portion 120) can be detected.

More specifically, according to the present embodiment, at a point in time when detection of the interface position of the molten portion 120 is carried out, the actual velocity or a value extremely close thereto is determined as an instantaneous velocity $\alpha$ of the transmissive waves 124, and based on such an instantaneous velocity $\alpha$, the interface position of the molten portion 120 is detected. Accordingly, the interface position can be detected with greater accuracy.

Naturally, in the same manner as the above, the distance from the lower end surface of the workpiece W12 to the interface of the molten portion 120 may also be determined.

Further, the distance from the first transmitter-receiver 116 to the end of the first welding tip 112, and the distance from the second transmitter-receiver 118 to the end of the second welding tip 114, may be different from each other. If H represents the distance from the first transmitter-receiver 116 to the end of the first welding tip 112, while I represents the distance from the second transmitter-receiver 118 to the end of the second welding tip 114, since H and I both lie along a straight line (rectilinearly), a proportional relation therebetween is established. That is, if γ is taken to define the proportional relation, the following equation is satisfied.

$$H=\gamma I \quad (2\text{-}10)$$

Accordingly, by transforming the above equation (2-10) the following equation (2-11) is derived.

$$F=\{E/[B-(1+\gamma)A/2]\}\times(C-A)/2 \quad (2\text{-}11)$$

In this manner, by incorporating the proportional relation into the calculations, the position of the molten portion 120 can easily be detected.

Furthermore, in the above embodiment, although transmitter-receivers are incorporated respectively into both the first welding tip 112 and the second welding tip 114, for example, the second transmitter-receiver 118 of the second welding tip 114 may be replaced by an internally-mounted receiver. In this case, for example, assuming that the distance between the end of the first welding tip 112 and the first transmitter receiver 116 and the distance between the end of the second welding tip 114 and the receiver are set equal to each other, the time required for the transmissive waves 124 to reach the receiver from the end of the second welding tip 114 becomes equal to the time required for the first reflected waves 122 to reach the first transmitter-receiver 116 from the end of the first welding tip 112. Consequently, the distance F in this case is determined from the following equation (2-12) obtained by a transformation of the above equation (2-9).

$$F=\{E/[B-A]\}\times(C-A)/2 \quad (2\text{-}12)$$

Of course, the distance from the first transmitter-receiver 116 to the end of the first welding tip 112, and the distance from the aforementioned internally-mounted receiver to the end of the second welding tip 114, may also be different from each other. In this case, the ratio between both distances is determined pursuant to the above equations (2-10) and (2-11), wherein such a ratio is incorporated into the calculations.

In either case, at the point in time that detection of the interface position of the molten portion 120 is performed, since the interface position of the molten portion 120 is detected based on the instantaneous transmissive wave velocity α of the transmissive waves 124, the interface position can be detected with greater accuracy.

Furthermore, a detection apparatus may also be constructed in which the first transmitter-receiver 116 is replaced with an internally-mounted receiver, whereas the second transmitter-receiver 118 remains incorporated in the second welding tip 114.

Although certain preferred embodiments of the present invention have been shown and described in detail, it should be understood that various changes and modifications may be made therein without departing from the scope of the appended claims.

What is claimed is:

1. A method of detecting the position of an interface of a molten portion, for detecting the position of an instantaneous interface of a molten portion that is generated when workpieces are placed mutually in abutment and spot welding is carried out thereon, the method comprising the steps of:
    determining an arrival time from when ultrasonic waves are made incident from a surface of at least one of the workpieces until the ultrasonic waves arrive at the instantaneous interface of the molten portion;
    determining an instantaneous velocity of the ultrasonic waves from a transmission time in which the ultrasonic waves are transmitted through the molten portion and a distance from a surface of one of the workpieces to a surface of another of the workpieces; and
    detecting the instantaneous interface position of the molten portion by multiplying the instantaneous velocity of the ultrasonic waves by the arrival time.

2. The method of detecting the position of an interface of a molten portion according to claim 1, wherein all reflected waves are measured as transverse waves and the transmissive waves are measured as longitudinal waves.

3. A method of detecting the position of an interface of a molten portion, for detecting the position of an interface of a molten portion that is generated when workpieces are placed mutually in abutment and spot welding is carried out thereon, the method comprising the steps of:
    transmitting first ultrasonic waves from a first transmitter-receiver of a first welding tip that abuts against a surface of one of the workpieces and toward a second transmitter-receiver of a second welding tip that abuts against a surface of another of the workpieces, together with transmitting second ultrasonic waves from the second transmitter-receiver of the second welding tip and toward the first transmitter-receiver of the first welding tip; and
    determining a distance F between an end of the first welding tip and the interface of the molten portion based upon a relationship that $$F=\{E/[B-(A/2+D/2)]\}\times(C-A)/2$$

wherein, among the first ultrasonic waves, A is a time required for first reflected waves that are reflected from an end of the first welding tip, to be emitted from the first transmitter-receiver and return to the first transmitter-receiver, B is a time required for transmissive waves that have been transmitted through the molten portion, to be emitted from the first transmitter-receiver and reach the second transmitter-receiver, C is a time required for second reflected waves that are reflected from the interface of the molten portion, to be emitted from the first transmitter-receiver and return to the first transmitter-receiver, and among the second ultrasonic waves, D is a time required for third reflected waves that are reflected from an end of the second welding tip, to be emitted from the second transmitter-receiver and return to the second transmitter-receiver, and E is a tip interval distance between the first welding tip and the second welding tip.

4. The method of detecting the position of an interface of a molten portion according to claim 3, wherein all of the reflected waves are measured as transverse waves, and the transmissive waves are measured as longitudinal waves.

5. A method of detecting the position of an interface of a molten portion, for detecting the position of an interface of a molten portion that is generated when workpieces are placed mutually in abutment and spot welding is carried out thereon, the method comprising the steps of:
    transmitting first ultrasonic waves from a first transmitter-receiver of a first welding tip that abuts against a surface of one of the workpieces and toward a second transmitter-receiver of a second welding tip that abuts against a surface of another of the workpieces, together with transmitting second ultrasonic waves from the second transmitter-receiver of the second welding tip and toward the first transmitter-receiver of the first welding tip; and
    determining a distance F between an end of the first welding tip and the interface of the molten portion based upon a relationship that $$F=\{E/[B-(1+\gamma)A/2]\}\times(C-A)/2$$

wherein, among the first ultrasonic waves, A is a time required for first reflected waves that are reflected from an end of the first welding tip, to be emitted from the first transmitter-receiver and return to the first transmitter-receiver, B is a time required for transmissive waves that have been transmitted through the molten portion, to be emitted from the first transmitter-receiver and reach the second transmitter-receiver, C is a time required for second reflected waves that are reflected from the interface of the molten portion, to be emitted from the first transmitter-receiver and return to the first transmitter-receiver, and E is a tip interval distance between the first welding tip and the second welding tip, and wherein a distance from the first transmitter-receiver to an end of the first welding tip is equal to a proportionality coefficient multiplied by a distance from the second transmitter-receiver to an end of the second welding tip.

6. The method of detecting the position of an interface of a molten portion according to claim 5, wherein all of the reflected waves are measured as transverse waves, and the transmissive waves are measured as longitudinal waves.

7. A method of detecting the position of an interface of a molten portion, for detecting the position of an interface of a molten portion that is generated when workpieces are placed mutually in abutment and spot welding is carried out thereon, the method comprising the steps of:

transmitting ultrasonic waves from a transmitter-receiver of a first welding tip that abuts against a surface of one of the workpieces and toward a receiver of a second welding tip that abuts against a surface of another of the workpieces; and determining a distance F between an end of the first welding tip and the interface of the molten portion based upon a relationship that $$F=\{E/[B-A]\}\times(C-A)/2$$

wherein, among the ultrasonic waves, A is a time required for first reflected waves that are reflected from an end of the first welding tip, to be emitted from the transmitter-receiver and return to the transmitter-receiver, B is a time required for transmissive waves that have been transmitted through the molten portion, to be emitted from the transmitter-receiver and reach the receiver, C is a time required for second reflected waves that are reflected from the interface of the molten portion, to be emitted from the transmitter-receiver and return to the transmitter-receiver, and E is a tip interval distance between the first welding tip and the second welding tip.

8. The method of detecting the position of an interface of a molten portion according to claim 7, wherein all of the reflected waves are measured as transverse waves, and the transmissive waves are measured as longitudinal waves.

9. An apparatus for detecting the position of an interface of a molten portion that is generated when workpieces are placed mutually in abutment and spot welding is carried out thereon, the apparatus comprising:

a first transmitter-receiver that is configured to transmit and receive ultrasonic waves, incorporated into a first welding tip constituting a spot welding apparatus;

a second transmitter-receiver that is configured to transmit and receive ultrasonic waves, incorporated into a second welding tip for performing spot welding together with the first welding tip; and tip interval distance measuring means for measuring a tip interval distance between the first welding tip and the second welding tip, wherein the first transmitter-receiver receives first reflected waves that are emitted from the first transmitter-receiver and reflected from an end of the first welding tip, and second reflected waves that are emitted from the first transmitter-receiver and reflected from the interface of the molten portion, wherein the second transmitter-receiver receives transmissive waves that are emitted from the first transmitter-receiver and transmitted through the molten portion, and third reflected waves that are emitted from the second transmitter-receiver and reflected from an end of the second welding tip, and wherein a distance from the first transmitter-receiver to an end of the first welding tip is equal to a proportionality coefficient multiplied by a distance from the second transmitter-receiver to an end of the second welding tip.

* * * * *